(12) United States Patent
Hamby (10) Patent No.: US 8,904,990 B2
(45) Date of Patent: Dec. 9, 2014

(54) DWELL CYCLE CRANK WITH ROLLERS

(76) Inventor: W. Daniel Hamby, Valdese, NC (US)

( * ) Notice: Subject to any disclaimer, the term of this patent is extended or adjusted under 35 U.S.C. 154(b) by 131 days.

(21) Appl. No.: 13/813,539

(22) PCT Filed: Aug. 2, 2011

(86) PCT No.: PCT/US2011/046240
§ 371 (c)(1),
(2), (4) Date: Jan. 31, 2013

(87) PCT Pub. No.: WO2012/018794
PCT Pub. Date: Feb. 9, 2012

(65) Prior Publication Data
US 2013/0125855 A1        May 23, 2013

Related U.S. Application Data

(60) Provisional application No. 61/370,151, filed on Aug. 3, 2010.

(51) Int. Cl.
*F16C 7/00*        (2006.01)
*F16C 9/00*        (2006.01)
(Continued)

(52) U.S. Cl.
CPC .... *F16C 7/00* (2013.01); *F01B 9/04* (2013.01);
*F01B 9/06* (2013.01); *F16H 21/28* (2013.01);
*F16H 35/10* (2013.01); *F02B 41/04* (2013.01);
*F02B 2075/025* (2013.01); *F16C 7/04*
(2013.01); *F16H 21/34* (2013.01); *F02B 75/22*
(2013.01); *B29C 70/86* (2013.01); *F16C 7/023*
(2013.01); *F02B 75/222* (2013.01); *E21B 1/02*
(2013.01); *F01B 9/023* (2013.01); *B25D
2211/003* (2013.01); *F02B 75/32* (2013.01);
*B62D 7/22* (2013.01); *F16C 9/04* (2013.01);
*B30B 1/265* (2013.01); *B25D 11/06* (2013.01);
*B25D 11/125* (2013.01); *F16C 7/026* (2013.01);
*F01B 9/02* (2013.01); *F02B 75/048* (2013.01);
*B60G 2206/11* (2013.01); *F04B 53/144*
(2013.01)
USPC .................................. 123/197.4; 123/197.3

(58) Field of Classification Search
CPC .... F02B 75/32; F02B 41/04; F02B 2075/025;
F02B 75/048; F02B 9/023; F02B 75/222;
F02B 75/22; F01B 9/023; F01B 9/02; F16C
7/026; F16C 7/023; F16C 9/04; F16C 7/04;
B60G 2206/11; B29C 70/86; F16H 21/34;
B62D 7/22; F04B 53/144; E21B 1/02
USPC .............. 123/197.4, 197.3; 74/50, 55–57, 25,
74/579 R, 580–586, 579 E, 579 F
See application file for complete search history.

(56) References Cited

U.S. PATENT DOCUMENTS

1,024,711 A     4/1912    Whidbourne et al.
1,090,991 A     3/1914    Knight
(Continued)

*Primary Examiner* — Lindsay Low
*Assistant Examiner* — Charles Brauch
(74) *Attorney, Agent, or Firm* — Jeffrey C. Watson; Balser & Grell IP Law (57) ABSTRACT

A dwell cycle crank configuration for converting reciprocating linear motion to rotary motion includes: a follower, a top roller, a bottom roller, and a body. The top roller has a bottom portion removed. The removed bottom portion of the top roller is adapted to fit the top of the follower. The bottom roller has a top portion removed. The removed top portion of the bottom roller is adapted to fit the bottom of said follower. The top and bottom rollers are positioned within the body where each roller is adapted to rotate for allowing the follower to ride between the rollers within the body in an S-shaped pattern.

20 Claims, 11 Drawing Sheets

(51) Int. Cl.
  *F01B 9/04* (2006.01)
  *F01B 9/06* (2006.01)
  *F16H 21/28* (2006.01)
  *F16H 35/10* (2006.01)
  *F02B 41/04* (2006.01)
  *F02B 75/02* (2006.01)
  *F16C 7/04* (2006.01)
  *F16H 21/34* (2006.01)
  *F02B 75/22* (2006.01)
  *B29C 70/86* (2006.01)
  *F16C 7/02* (2006.01)
  *E21B 1/02* (2006.01)
  *F01B 9/02* (2006.01)
  *F02B 75/32* (2006.01)
  *B62D 7/22* (2006.01)
  *F16C 9/04* (2006.01)
  *B30B 1/26* (2006.01)
  *B25D 11/06* (2006.01)
  *B25D 11/12* (2006.01)
  *F02B 75/04* (2006.01)
  *F04B 53/14* (2006.01)

(56) References Cited

U.S. PATENT DOCUMENTS

| | | | |
|---|---|---|---|
| 1,505,856 A * | 8/1924 | Briggs | 74/50 |
| 1,508,614 A * | 9/1924 | Powell | 123/66 |
| 1,574,573 A * | 2/1926 | Hale | 74/36 |
| 2,734,494 A | 2/1956 | Waterval | |
| 3,753,386 A * | 8/1973 | Scott, Jr. | 92/5 R |
| 4,148,284 A | 4/1979 | Prosen | |
| 4,272,996 A * | 6/1981 | Sauerwein | 74/50 |
| 4,580,532 A | 4/1986 | Jackson | |
| 4,584,972 A | 4/1986 | Jayne et al. | |
| 5,375,566 A * | 12/1994 | Brackett | 123/55.5 |
| 5,445,039 A * | 8/1995 | Brackett | 74/49 |
| 5,513,541 A * | 5/1996 | Brackett | 74/49 |
| 5,575,173 A * | 11/1996 | Brackett | 74/49 |
| 5,655,404 A | 8/1997 | Tsepenuk | |
| 6,202,622 B1 | 3/2001 | Raquiza, Jr. | |
| 7,077,097 B2 | 7/2006 | Spangler | |
| 2004/0261733 A1* | 12/2004 | Henig et al. | 123/78 E |
| 2007/0034175 A1* | 2/2007 | Higgins | 123/53.3 |
| 2008/0276898 A1* | 11/2008 | Wang et al. | 123/192.2 |
| 2011/0239979 A1 | 10/2011 | Hamby | |

* cited by examiner

DWELL CYCLE CRANK WITH ROLLERS

RELATED APPLICATION

This application claims the benefit of U.S. Provisional application Ser. No. 61/370,151 filed Aug. 3, 2010.

FIELD OF THE INVENTION

The instant invention relates to reciprocating engines, and more particularly, to a dwell cycle crank configuration that efficiently utilizes energy to convert reciprocating linear motion to rotary motion or vice versa.

BACKGROUND OF THE INVENTION

A conventional internal combustion engine (ICE) having a piston cylinder attached to a crank arm or yoke offset from the crank shaft proceeds through various processes in a typical cycle; intake, compression, power, and exhaust. In a four stroke engine, each process occurs in each stroke of the piston, i.e., first stroke (downward) corresponds to an intake process or charging of a fuel-air mixture, second stroke (upward) corresponds to a compression process of the mixture, third stroke (downward) corresponds to a power process in which the mixture is ignited to produce energy for turning the crank, and fourth stroke (upward) corresponds to the exhaust process which vents the waste products of combustion from the piston chamber. The directions indicated above in parentheses are mainly illustrative of a configuration in which the piston cylinder is arranged to reciprocate in a vertical orientation. It is noted that many conventional ICEs include various configurations of pistons that depart from vertical.

Another common type of ICE is a two-stroke engine in which two of the four processes mentioned above occur in the same stroke. For example, the first stroke (downward) includes the intake and power processes while the second stroke (upward) includes the compression and exhaust processes.

The efficiency of the above mentioned engines is measured in part by how an engine maximizes the thermo energy produced via combustion, since an ICE is fundamentally a practical application of heat transfer thermodynamics. It is recognized that many factors are involved in determining the efficiency of an ICE, e.g. the crank and piston geometry, compression ratios, charge durations, burn durations, engine tuning parameters, air-fuel mixture, engine block temperature, etc. However, one of the main factors for inefficient operation in an engine is potential heat loss during a cycle. Some attributing examples may be mistimed ignition of the air-fuel mixture that results in less than maximum consumption of the resource and thereby produces sub-optimal power to turn the crank, or simple heat loss between the piston cylinder chamber and the surrounding engine block and/or other attached components. Hence, most commercial engines in vehicles have roughly 20% efficiency. Due to current economics and dwindling resources, there exists a need for more efficient engines.

Figure 1:
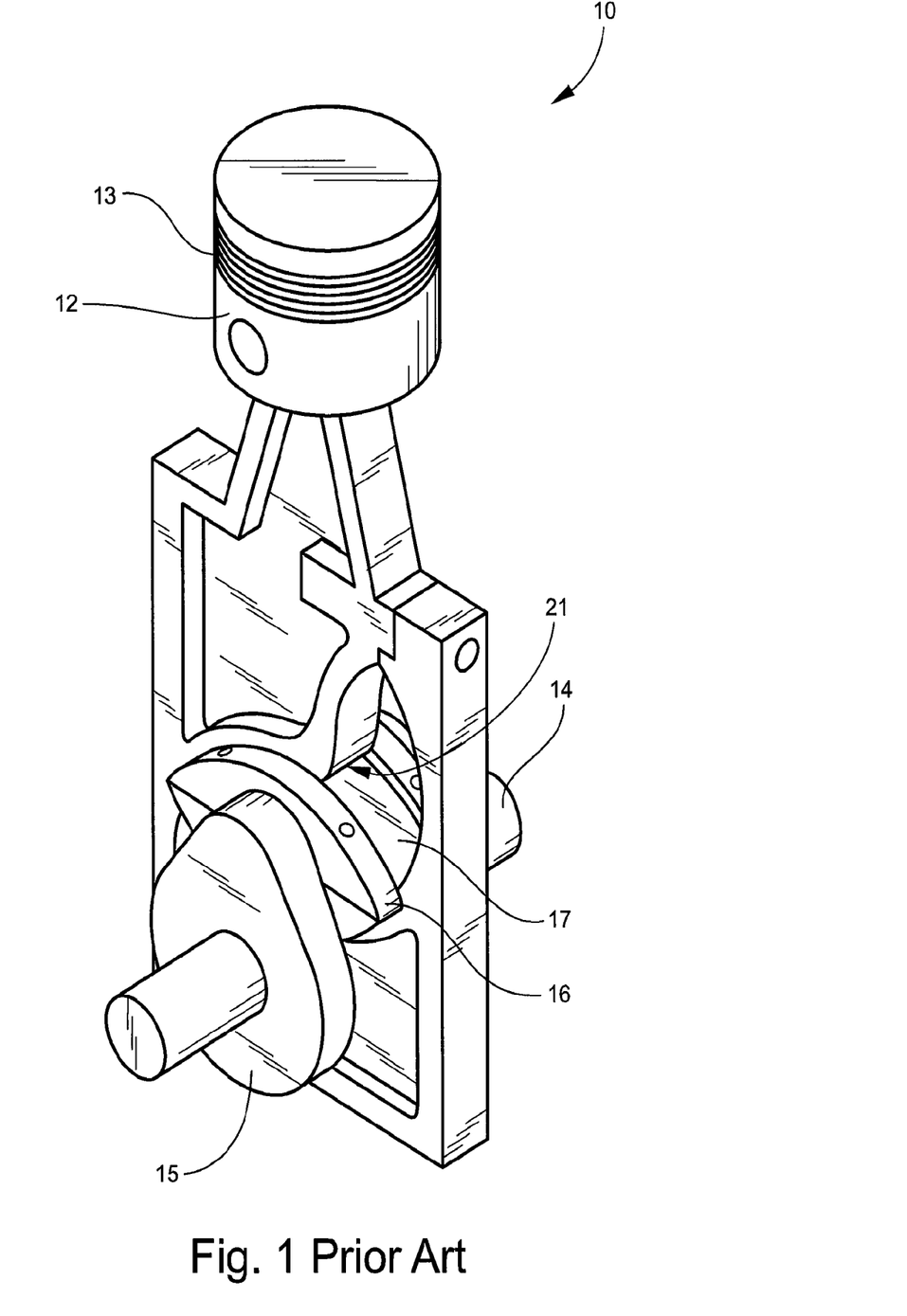
FIG. 1 is an environmental, perspective view of a dwell cycle crank according to the prior art.
Figure 2:
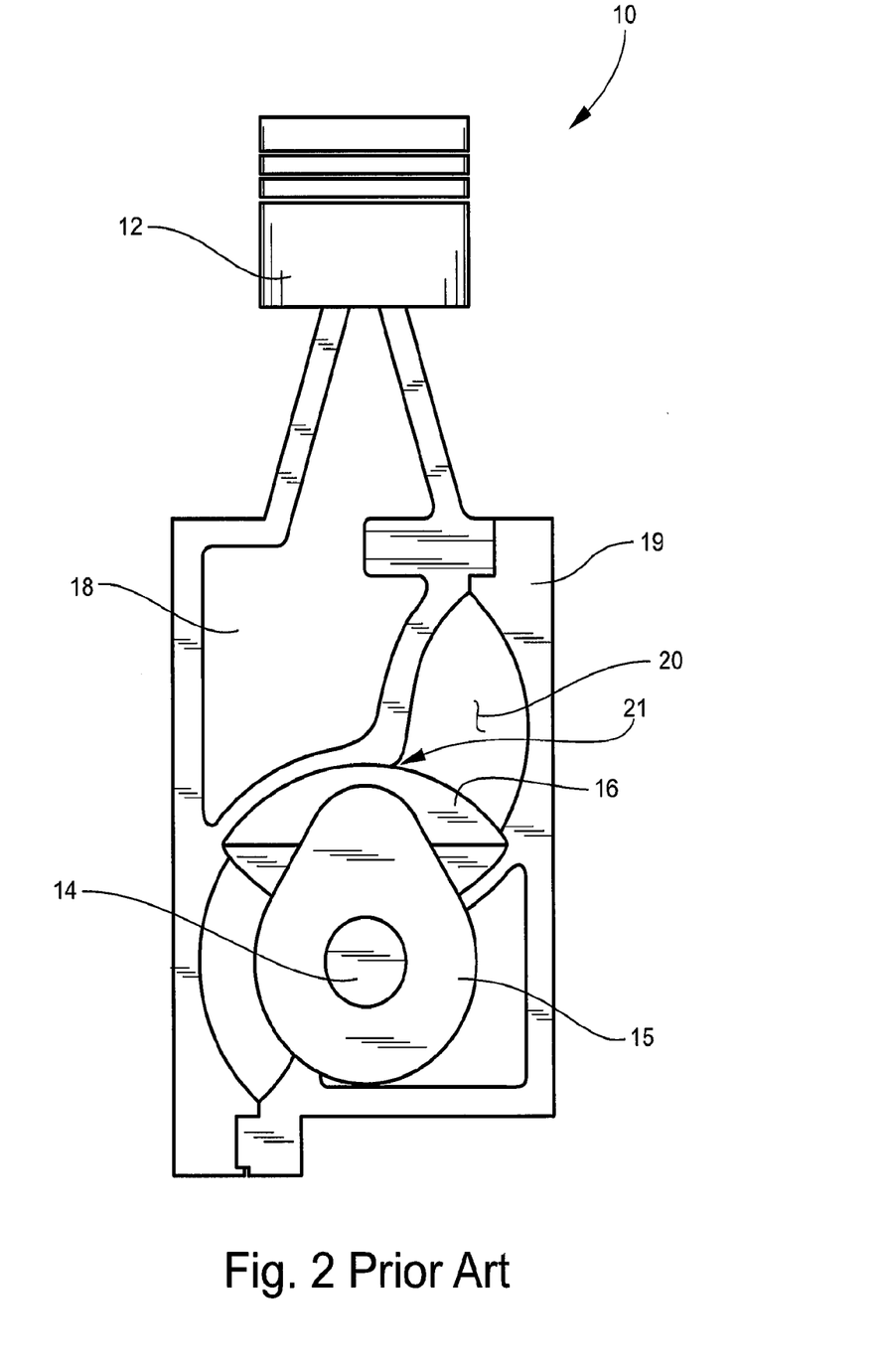
FIG. 2 is a front view of a dwell cycle crank according to the prior art.

International PCT application number US2009/06700 discloses a dwell cycle crank designed to solve the aforementioned problems. This international application in its entirety is incorporated herein by reference. The dwell cycle crank of said application includes a reciprocating piston having a piston head or cylinder, a main body connected to the piston head, a cap detachably mounted to the main body, an S-shaped cam formed between the main body and the cap, a connecting bearing or follower disposed in the S-shaped cam, a rotatable crankshaft, and an offset journal disposed between the connecting bearing and the crankshaft to thereby form a torque arm. FIGS. 1-3 of this application show the dwell cycle crank of this prior art PCT application. The S-shaped cam and connecting bearing create dwells and faster strokes at key points in the crank cycle to maximize volumetric and geometric efficiencies of the engine.

Although the dwell cycle crank of International PCT application number US2009/06700 is known to improve the volumetric and geometric efficiencies of the engine, this prior art dwell cycle crank can be improved. One area that could be improved was the heavy contact points between the follower and the top and bottom of the S-shaped cam. These heavy contact points may lead to wearing down of the follower and/or S-shaped cam which may lead to decreased performance and efficiency of the engine and/or engine failure. Thus, there is clearly a need to improve the dwell cycle crank of International PCT application number US2009/06700 by reducing or eliminating the heavy contact points between the follower and the S-shaped cam.

The instant invention is designed to provide a dwell cycle crank that addresses the above mentioned problems.

SUMMARY OF THE INVENTION

The instant invention is directed toward a dwell cycle crank configuration for converting reciprocating linear motion to rotary motion that includes rollers. The dwell cycle crank includes: a follower, a top roller, a bottom roller, and a body. The top roller has a bottom portion removed. The removed bottom portion of the top roller is adapted to fit the top of the follower. The bottom roller has a top portion removed. The removed top portion of the bottom roller is adapted to fit the bottom of said follower. The top and bottom rollers are positioned within the body where each roller is adapted to rotate for allowing the follower to ride between the rollers within the body in an S-shaped pattern.

BRIEF DESCRIPTION OF THE DRAWINGS

For the purpose of illustrating the invention, there is shown in the figures a form that is presently preferred; it being understood, however, that this invention is not limited to the precise arrangements and instrumentalities shown.

DETAILED DESCRIPTION

Referring to the drawings, where like numerals indicate like elements, there is shown in FIGS. 1-2 an embodiment of a dwell cycle crank 10 as shown in International PCT application number US2009/06700. The instant invention is directed to a dwell cycle crank with a similar dwell cycle to the one shown in international PCT application no. US2009/06700 (see FIGS. 1-2), but with some improvements to the structure of the dwell cycle crank.

As shown in FIGS. 1-2, the prior art dwell cycle crank 10 includes a reciprocating piston having a piston head or cylinder 12 pivotally connected to a main body 18. The piston is adapted to reciprocate in a straight line within the cylinder chambers of an engine, and the reciprocating motion of the piston is translated to rotation of a crank. The piston head 12 includes annular grooves 13 for mounting seal rings (not shown). The lower diagonal portion of the main body 18 has a curvilinear profile that forms half of an overall cam. A cap 19 is detachably mounted to the main body 18, and the upper diagonal portion of the cap 19 has a curvilinear profile that forms the other half of the overall cam. Thus, as more clearly shown in FIG. 2, the curvilinear profiles of the main body 18 and the cap 19 together form a curvilinear slot or an S-shaped cam 20.

The piston 12 of this prior art dwell cycle crank is operatively connected to a crankshaft 14 via a torque arm/offset journal 15. In turn, the offset journal 15 is attached to a connecting bearing or follower 17, which is disposed within and adapted to ride between the extreme ends of the cam 20. The follower 17 is a substantially oval shape that conforms to the shape of the cam. The follower 17 may be composed of two identical halves mountable on the bearing of the offset journal 15. Each identical half includes outwardly extending flanges 16 at the ends thereof. When assembled, these flanges 16 are disposed on opposite sides of the main body 18 and cap 19, and they project a certain extent past the edge of the S-shaped cam 20 to thereby prevent any inadvertent disengagement of the follower 17 from the same.

Although the dwell cycle crank 10 shown in FIGS. 1-2 is known to improve the volumetric and geometric efficiencies of the engine, it has been determined that this prior art dwell cycle crank can be improved. One area that was determined to need improvement was the heavy contact points between the follower 17 and the top and bottom of the S-shaped cam 20. These heavy contact points may lead to wearing down of the follower 17 and/or S-shaped cam 20 which may lead to decreased performance and efficiency of the engine and/or engine failure. Thus, there is clearly a need to improve the dwell cycle crank 10 by reducing or eliminating the heavy contact points between the follower and the S-shaped cam.

Referring to FIGS. 4-12, wherein like numerals indicate like elements, the dwell cycle crank 100 of the instant invention is shown. Dwell cycle crank 100 may be for converting reciprocating linear motion to rotary motion or vice versa. Dwell cycle crank 100 may utilize the same S-shaped pattern 114 and dwell cycle of dwell cycle crank 10 of International PCT application number US2009/06700, as shown in FIGS. 1-2. As shown in FIGS. 3A-3H, the prior art dwell cycle crank includes an oval follower 17 that rides in an S-shaped cam 20 within the body. One concern with this configuration is that the oval shaped follower 17 has heavy contact points at the start of the upward and downward portions of the S-shaped cam (upward heavy contact point 21 shown in FIGS. 1 and 2). This is believed to be an area of concern as it could lead to erosion of these points and eventually to a failure of the dwell cycle crank.

The instant invention is designed to eliminate these two heavy contact points by creating a constant contact surface between the follower and a top and bottom roller. As shown in FIGS. 4-12, dwell cycle crank 100 may generally include a follower 102, a top roller 104, a bottom roller 108, and a body 112. These parts are discussed in great detail below.

Figure 6:
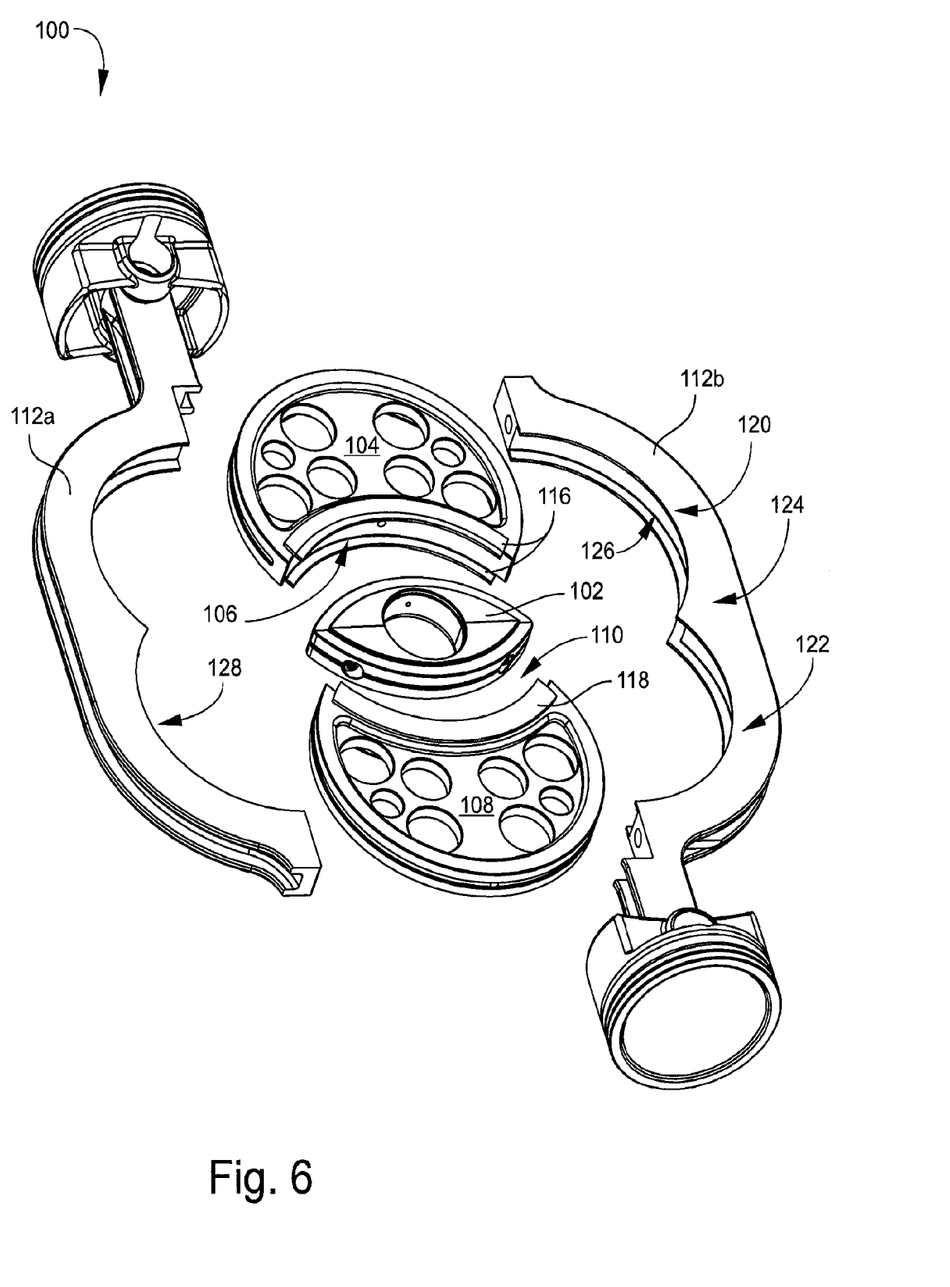
FIG. 6 illustrates a partially disassembled perspective view of the dwell cycle crank shown in FIG. 5.
Figures 7, 8, 9:
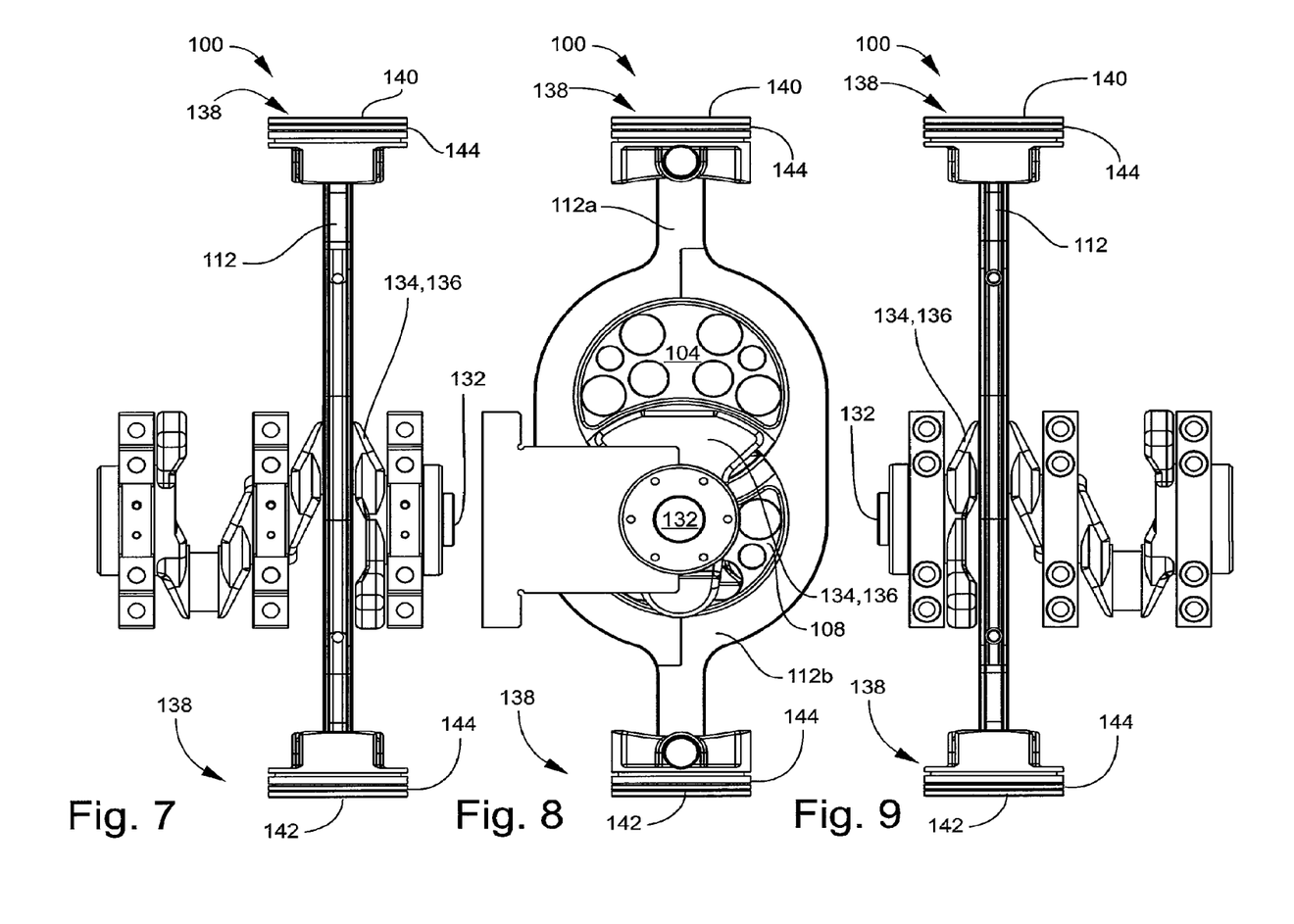
FIG. 7 illustrates a side view of one embodiment of a dwell cycle crank according to the instant invention with a crank shaft and torque arm.
FIG. 8 illustrates a front view of the dwell cycle crank shown in FIG. 7.
FIG. 9 illustrates another side view of the dwell cycle crank shown in FIG. 7.

Follower 102 may be included in dwell cycle crank 100 of the instant invention. See FIGS. 4-6. Follower 102 may be similar to follower 17 of dwell cycle crank 10 of International PCT application number US2009/06700 as shown in FIGS. 1-2. The follower 102 may be any shape, including being substantially oval shape that conforms to the shape of the removed portions of the top and bottom rollers. The follower 102 may be composed of two identical halves mountable on the bearing of the offset journal 136. The top 102a of follower 102 may fit against the surface of removed bottom portion 106, and the bottom 102b may fit against the surface of removed top portion 110. In one embodiment, follower 102 may include outwardly extending flanges for maintaining the follower 102 between the top roller 104, bottom roller 108 and body 112 (see prior art embodiment of FIGS. 1-2). In another embodiment, as shown in FIG. 6, the top roller 104 may include top outwardly extending flanges 116 and the bottom roller 108 may include bottom outwardly extending flanges 118 for maintaining the follower 102 between the top roller 104, bottom roller 108 and body 112.

Figure 4A:
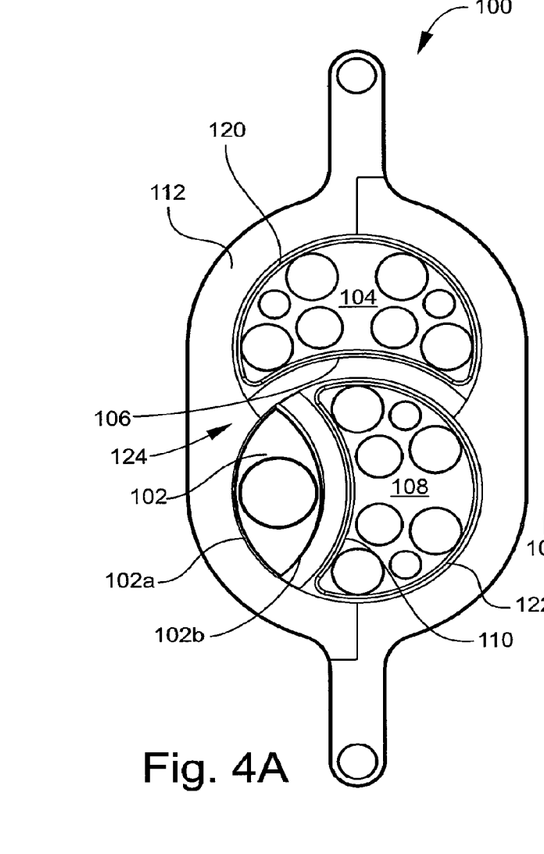
FIG. 4A illustrates a front view of a dwell cycle crank according to the instant invention at approximately top dead center of the dwell cycle.
Figures 4B, 4C:
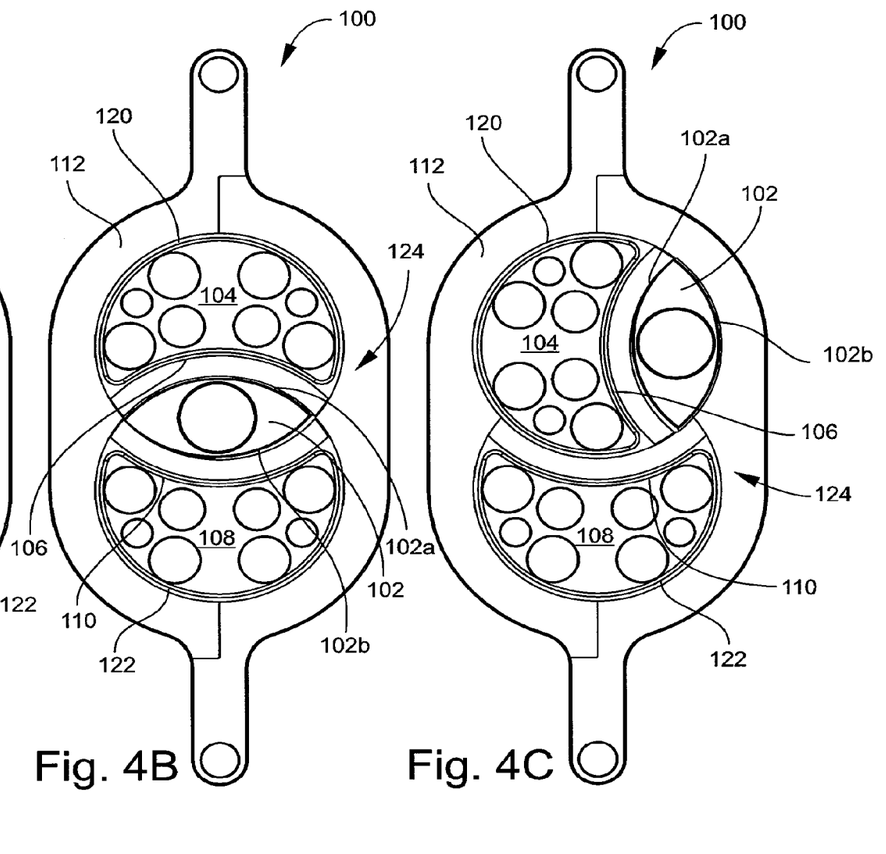
FIG. 4B illustrates a front view of a dwell cycle crank according to the instant invention at approximately the mid point of the dwell cycle.
FIG. 4C illustrates a front view of a dwell cycle crank according to the instant invention at approximately bottom dead center of the dwell cycle.
Figure 5:
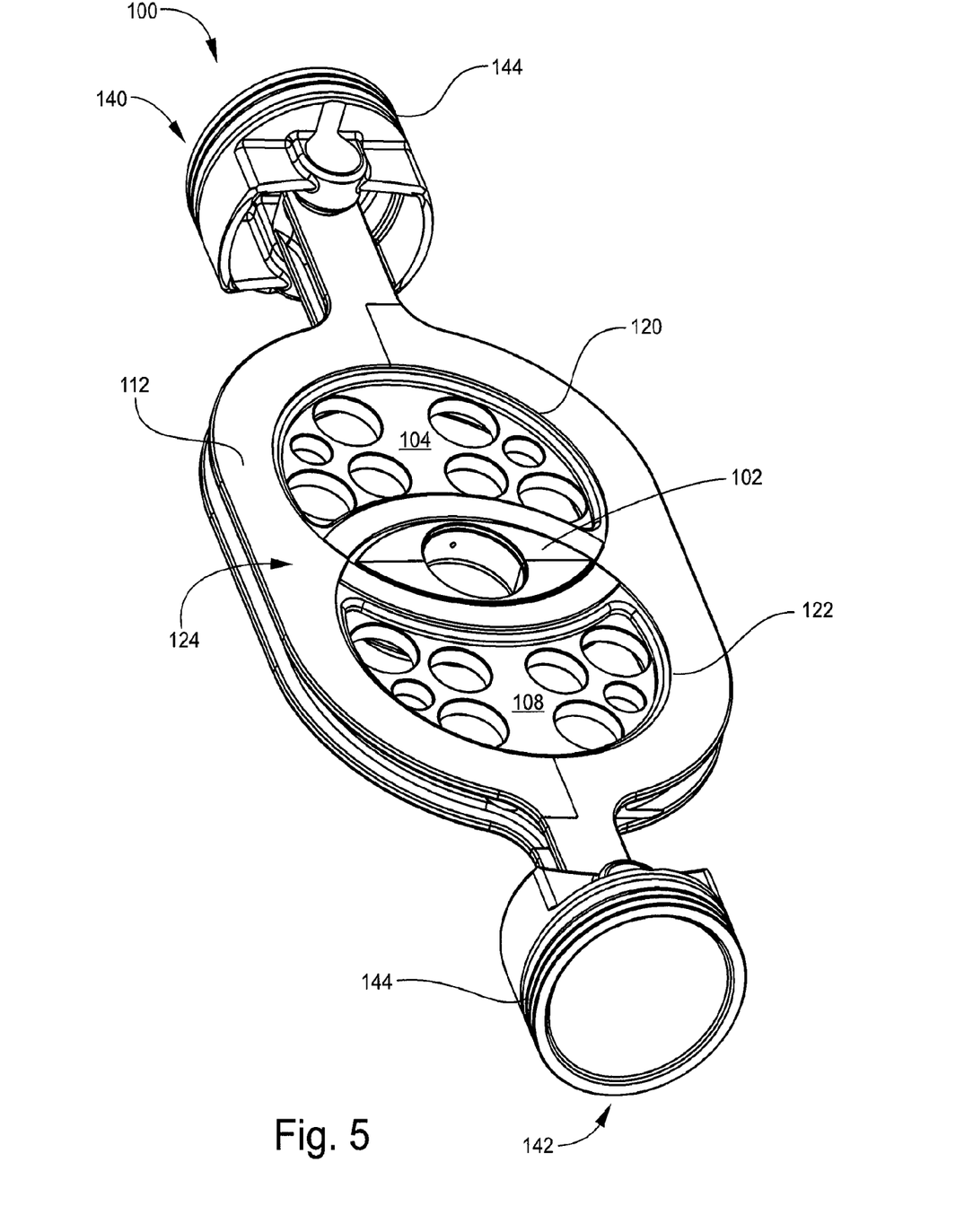
FIG. 5 illustrates a perspective view of one embodiment of the dwell cycle crank according to the instant invention.

The top roller 104 may be included in dwell cycle crank 100 of the instant invention. See FIGS. 4-6 and 8. Top roller 104 may be for providing a top surface for positioning follower 102 within body 112 and allowing the follower 102 to move in the top portion of S-shaped pattern 114. In one embodiment, the top roller 104 may be substantially circular shaped. Top roller 104 may have a removed bottom portion 106. The removed bottom portion 106 may be adapted to fit the top 102a of follower 102. In one embodiment, top roller 104 may have top outwardly extending flanges 116 on both sides of removed bottom portion 106. Top outwardly extending flanges 116 may be for maintaining the follower 102 between the top roller 104, bottom roller 108 and body 112. Top roller 104 may be rotatably positioned in first hole 120 of body 112. As shown in FIG. 4C, the top roller 104 may rotate to allow follower 102 to move to the top of S-shaped pattern 114. As shown in the Figures, top roller 104 may include holes for providing air flow through dwell cycle crank 100.

The bottom roller 108 may be included in dwell cycle crank 100 of the instant invention. See FIGS. 4-6 and 12. Bottom roller 108 may be for providing a bottom surface for positioning follower 102 within body 112 and allowing the follower 102 to move in the bottom portion of S-shaped pattern 114. In one embodiment, bottom roller 108 may be substantially circular shaped. Bottom roller 108 may have a removed top portion 110. The removed top portion 110 may be adapted to fit the bottom 102*b* of follower 102. In one embodiment, bottom roller 108 may have bottom outwardly extending flanges 118 on both sides of removed top portion 110. Bottom outwardly extending flanges 118 may be for maintaining the follower 102 between the top roller 104, bottom roller 108 and body 112. Bottom roller 108 may be rotatably positioned in second hole 122 of body 112. As shown in FIG. 4A, the bottom roller 108 may rotate to allow follower 102 to move to the bottom of S-shaped pattern 114. As shown in the Figures, bottom roller 108 may include holes for providing air flow through dwell cycle crank 100. In one embodiment, bottom roller 108 may have the same dimensions as top roller 104.

The body 112 may also be included in the dwell cycle crank 100 of the instant invention. See FIGS. 4-9. Body 112 may be for housing top roller 104, bottom roller 108 and follower 102. In addition, body 112 may be for connecting top piston 140 and/or bottom piston 142, as shown in FIGS. 5-9. Body 112 may be any shape or size device for housing top roller 104, bottom roller 108 and follower 102. As shown in the Figures, in one embodiment, body 112 may be substantially oval shaped with arms extending from the top and bottom of the oval for connecting to the pistons. However, the invention is not so limited and body 112 may have other shapes and sizes, including, but not limited to the shape of body 18 from dwell cycle crank 10 of International PCT application number US2009/06700, as shown in FIGS. 1-2. Body 112 may have a first hole 120 for housing top roller 104 and a second hole 122 for housing bottom roller 108. First hole 120 and second hole 122 may be positioned to include an overlapping section 124. Overlapping section 124 may be approximate to the size of follower 102 (see FIG. 4B). As such, the follower 102 may be adapted to be positioned in the overlapping section 124. In one embodiment, the first hole 120 may have an extended radius 126 on its right side and the second hole 122 may have an extended radius 128 on its left side, or vice versa depending on the shape of S-shaped pattern 114. See FIG. 6. The extended radiuses 126 and 128 may be adapted to create the S-shaped cam 130 for the follower 102.

A crankshaft 132 may be included with dwell cycle crank 100 of the instant invention. Crankshaft 132 may be for outputting the reciprocal motion from dwell cycle crank 100. Crankshaft 132 may include a torque arm 134. Torque arm 134 may be operatively attached to follower 102. Torque arm 134 may be an offset journal 136. The movement of the follower 102 riding in the S-shaped pattern 114 between top and bottom rollers 104 and 18 during a cycle of the crankshaft (see FIGS. 3A-3H) may create periodic dwells and strokes of crankshaft 132. The periodic dwells and strokes of crankshaft 132 may be adapted for maximizing volumetric and geometric efficiency of an associated engine.

Referring to FIGS. 4A-4C, the top roller 104 and the bottom roller 108 may be positioned within body 112 where each roller may be adapted to rotate for allowing the follower 102 to ride between the top and bottom rollers within the body in an S-shaped pattern 114, as illustrated in FIGS. 3A-3H. The rotation of the top and bottom rollers 104 and 108 within the body may thus create the S-shaped cam 130 for the follower 102 to move in the S-shaped pattern 114 within the S-shaped cam 130 created by the rollers.

Figure 3A:
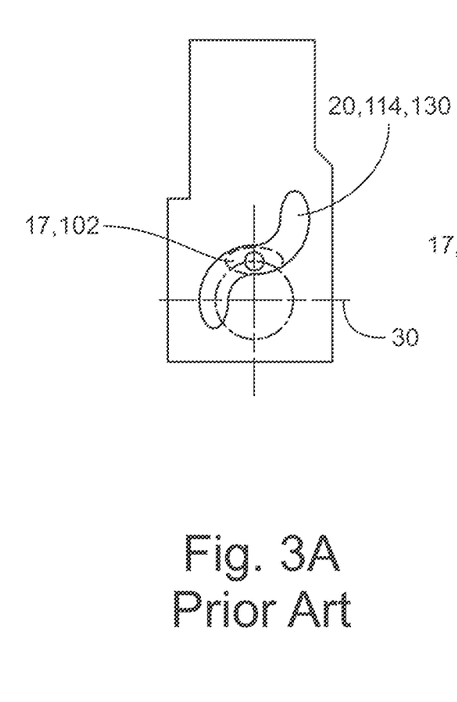
FIGS. 3A, 3B, 3C, 3D, 3E, 3F, 3G, and 3H are schematic views of various stages in a cycle of a dwell cycle crank according to the prior art and according to the present invention.
Figure 3B:
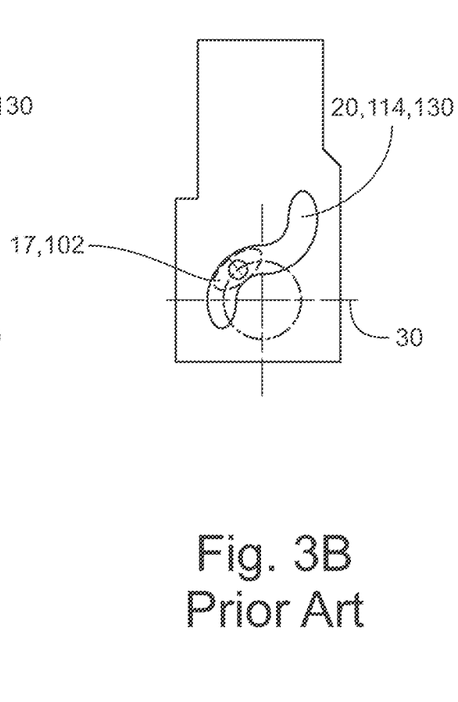
Figure 3C:
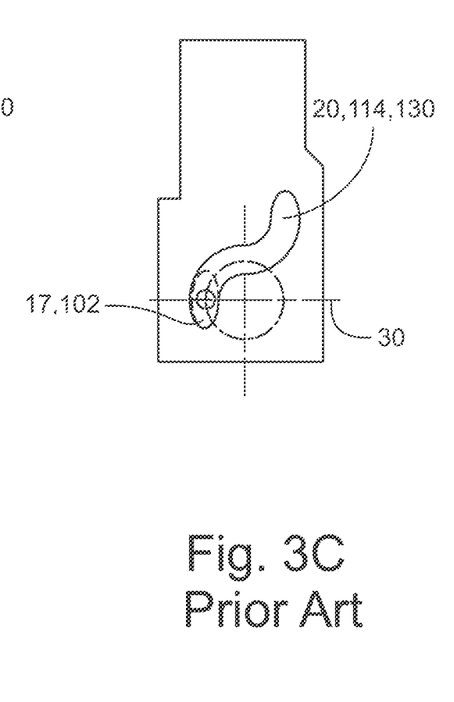
Figure 3D:
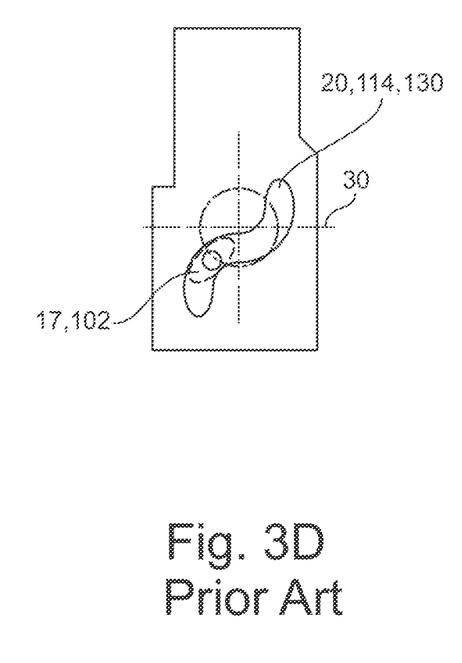
Figures 3E, 3F:
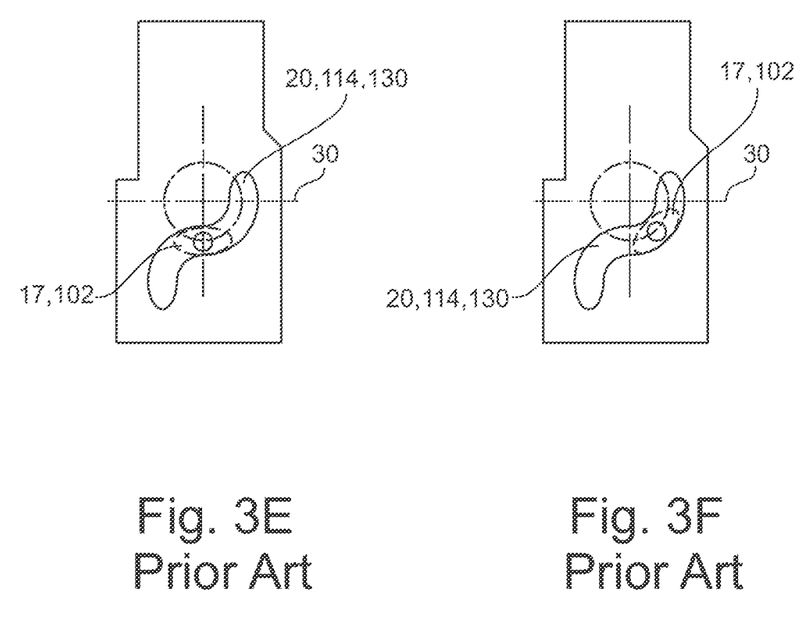

Turning to FIGS. 3A-3H, these figures illustrate the dwell cycle of dwell cycle crank 10 of International PCT application number US2009/06700 as well as the dwell cycle for the instant dwell cycle crank 100, as shown in FIGS. 4-12. FIGS. 3A-3H relate to one complete cycle of 360 degree rotation of the crankshaft 132 (see FIGS. 7-9 and 11-12) or crankshaft 17 of the prior art. Moreover, reference numeral 30 represents a comparative reference line to determine relative reciprocating motion of the piston. In FIGS. 3A-3C, the piston is locked at top dead center (TDC) while the follower 102 (see FIGS. 4-6), or follower 17 of the prior art, has moved from centered in the S-shaped cam 130, or S-shaped cam 20 of the prior art, to 45 degrees, to 90 degrees respectively in the Figures. The piston is prevented from movement, i.e. downward, due to the interface and position of the follower 102 in the S-shaped cam 130 at each stage. This is the first dwell stage in the cycle.

At the stage shown in FIG. 3C, the piston is free to move downward. From FIGS. 3C-3E, the piston has reached bottom dead center (BDC) within a span of 90 degrees rotation of the crankshaft 132, i.e. the follower 102 has traveled back along the S-shaped cam 130 from the 90 degree mark to the 135 degree and the 180 degree marks. In the stages shown in FIGS. 3E-3G, the piston is locked at BDC while the follower 102 has moved from centered in the S-shaped cam 130 at 180 degrees to 225 degrees and 270 degrees respectively in the Figures. The piston is prevented from movement, i.e. upward, due to the interface and position of the follower 102 in the S-shaped cam 20 at each stage. This is the second dwell stage in the cycle.

Figure 3G:
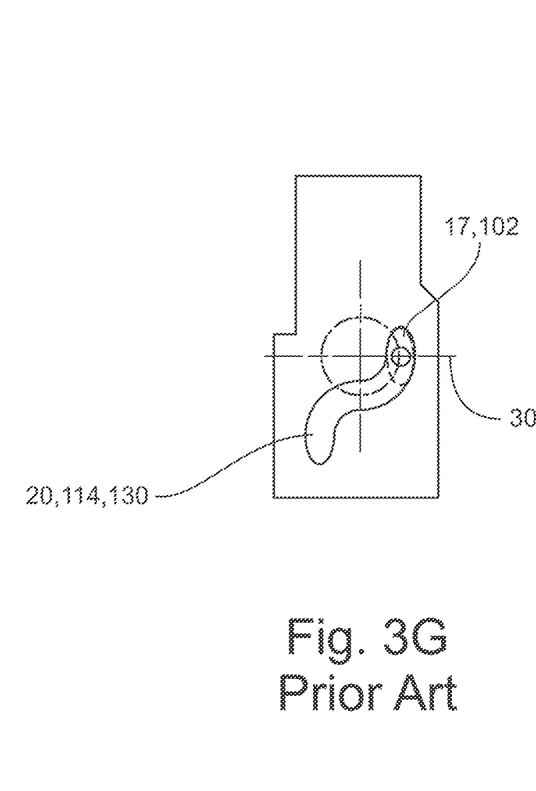
Figure 3H:
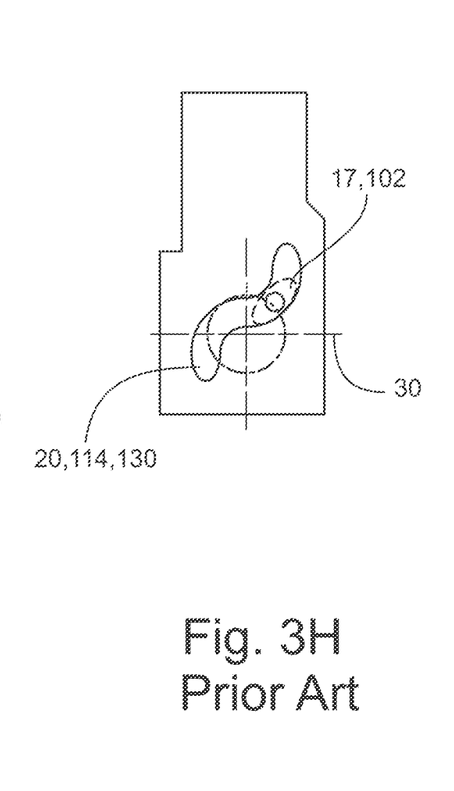

At the stage shown in FIG. 3G, the piston is free to move upward. From FIGS. 3G, 3H, and back to 3A, the piston has reached TDC within a span of 90 degrees rotation of the crankshaft 132, i.e. the follower 102 has traveled back along the S-shaped cam 130 from the 270 degree mark to the 315 degree and the 360 degree marks. At this point, the cycle repeats itself.

Referring to FIGS. 3C-3G where the dwell cycle crank 100 performs a downward stroke stage and a second dwell stage, these stages produce greater volumetric efficiency. Compared to some conventional engines in which a piston stroke occurs in 180 degrees of rotation of the crankshaft, the dwell cycle crank 100 performs the same stroke in a span of 90 degrees. This means a much faster stroke, i.e. same volume traversed in less time compared to conventional. The faster stroke creates higher negative pressure or ram effect within the piston chamber of the engine block. Thus, any given charge being introduced at that span of time will be drawn at a quicker rate. The subsequent dwell stage shown in FIGS. 3E-3G allows the given charge more time to fill the chamber. These two features maximize the volume of the given charge and thereby increase the volumetric efficiency of the engine.

Referring to FIGS. 3G, 3H, and 3A-3C where the dwell cycle crank 100 performs an upward stroke stage and a first dwell stage, these stages produce greater geometric efficiency. From the stages shown in FIGS. 3G, 3H and 3A, the dwell cycle crank 100 performs an upward stroke at a faster rate than conventional in same manner described above. This results in compression of the charge at a much faster rate whereby a higher compression ratio may be obtained for the given volume of the piston chamber. A higher compression ratio maximizes the potential energy in the mass of the given charge to be translated into mechanical energy for the engine. The second dwell stage from FIGS. 3A-3C provides time to allow the pressure to build, and in the case of ICEs, time for a more complete burn of the charge.

The geometric efficiency occurs at the stage shown in FIG. 3C. In conventional IC engines, the compressed charge is ignited about 8-12 degrees before TDC and continues about 20 degrees past TDC as a way to ensure a more complete burn. As a result, less than peak pressure is applied to the crank due to application of the pressure on the offset journal at varying compound angles. In contrast, the dwell cycle crank 100 allows application of peak pressure at the most advantageous angle, i.e. at or close to 90 degrees as shown in FIG. 3C. In other words, a given force acting on a crank arm is less effective or diminishes the further the force deviates from perpendicular. The shape of the follower 102 ensures that the most advantageous angle for application of pressure can be obtained because it minimizes compound angle application. Thus, geometric efficiency is achieved by the above features.

Figure 10:
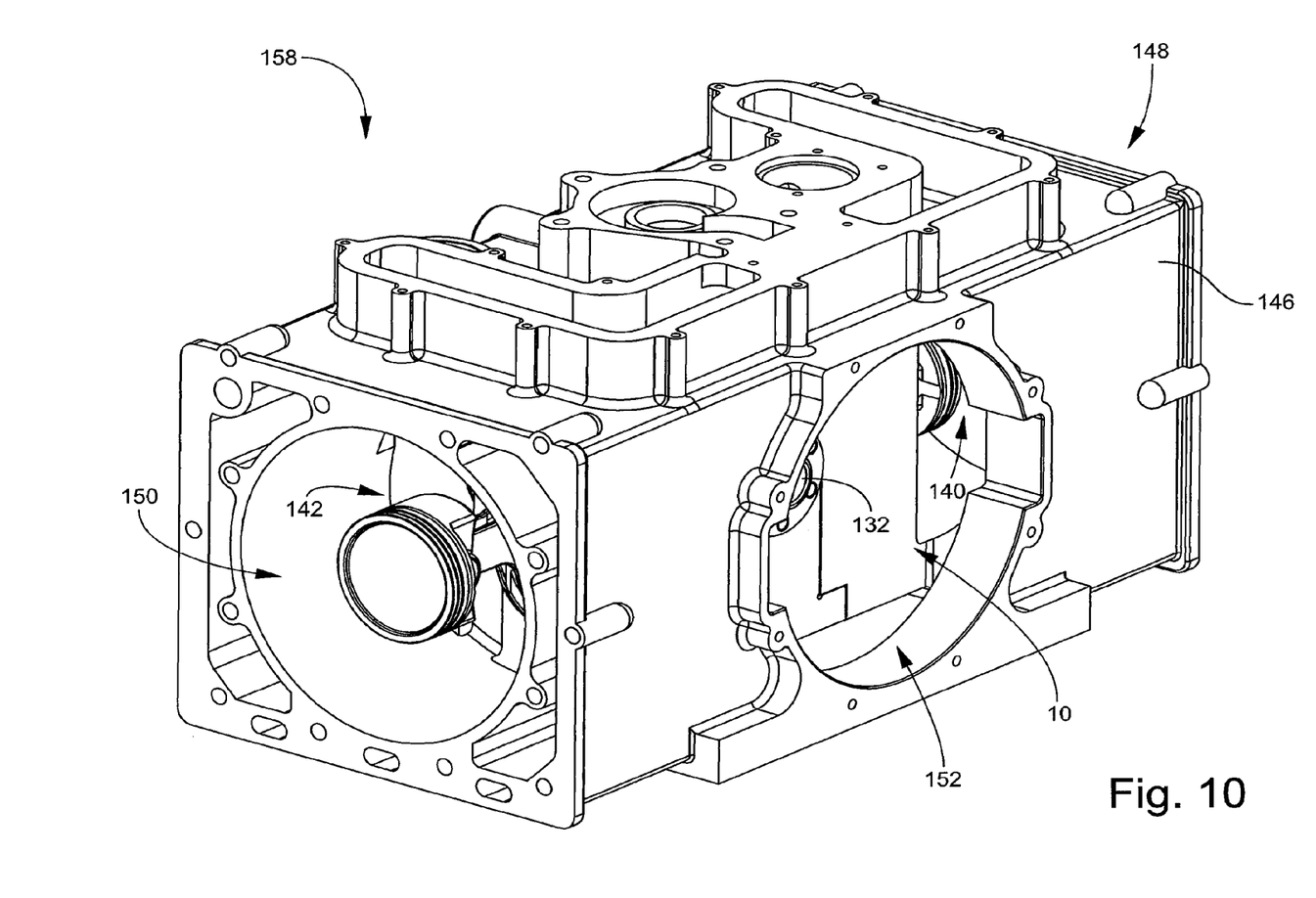
FIG. 10 illustrates a perspective view of an engine with the dwell cycle crank according to one embodiment of the instant invention.
Figure 11:
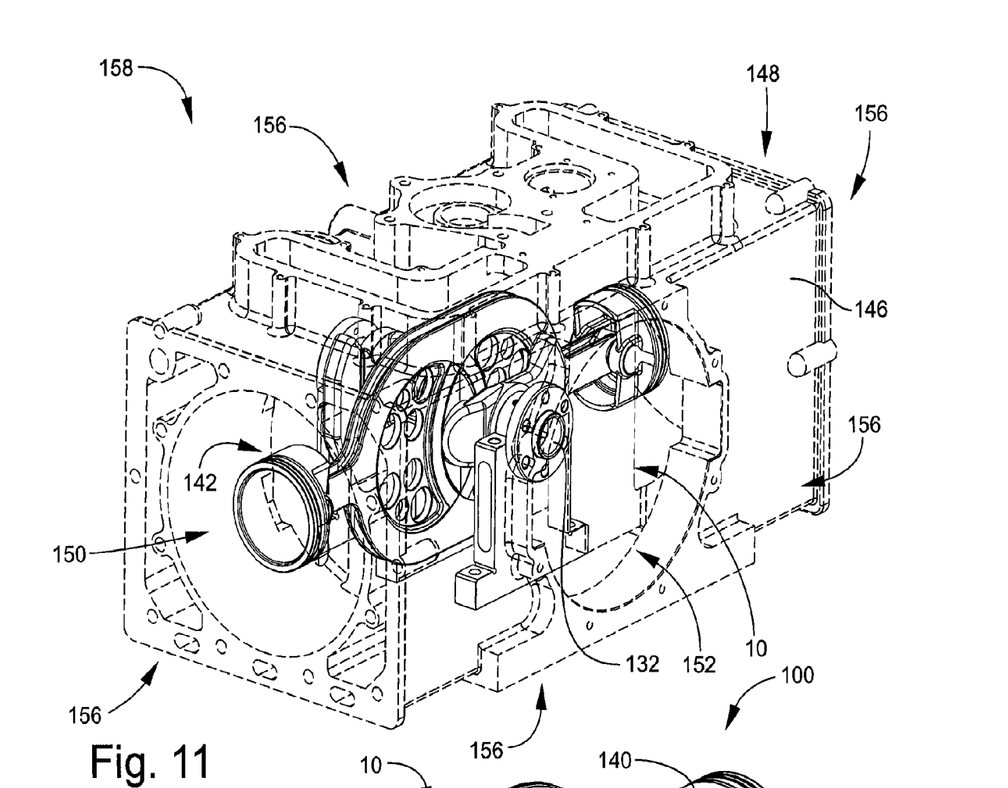
FIG. 11 illustrates a line perspective view of shown in FIG. 10.
Figure 12:
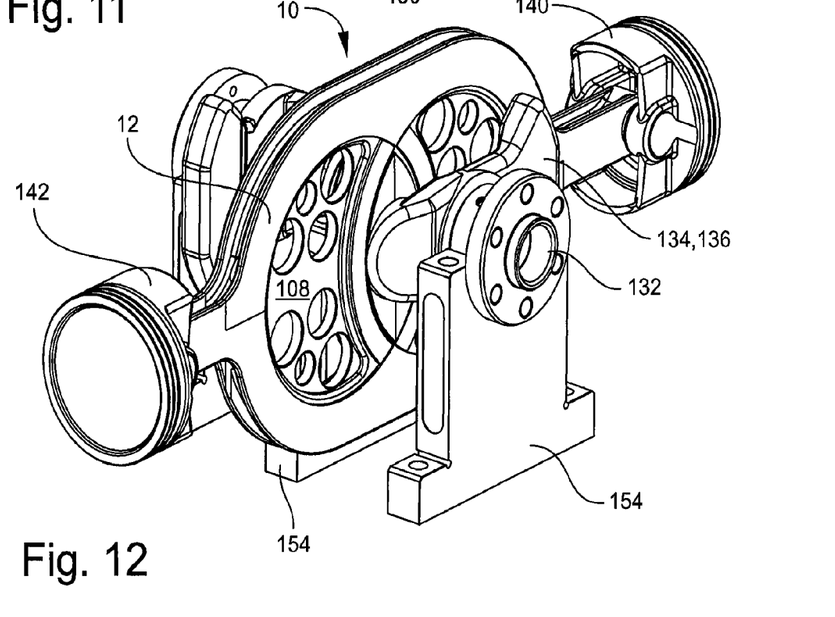
FIG. 12 illustrates a perspective view of another embodiment of the dwell cycle crank according to the instant invention with the crank shaft and torque arm mounted on the engine housing mounting brackets.

Referring to FIGS. 10-12, the instant invention also includes an engine 158. Engine 158 may be for utilizing dwell cycle crank 100 to provide optimized volumetric and geometric efficiencies. Engine 158 may generally include dwell cycle crank 100, as described above. In addition, engine 158 may include a reciprocating piston 138, and a housing 146.

The reciprocating piston or pistons 138 may be included in engine 158. See FIGS. 5-12. The reciprocating pistons may be for providing linear motion to dwell cycle crank 100. The reciprocating piston or pistons 138 may have a piston cylinder being attached to the body and annular groves 144. The engine 158 may include a single reciprocating piston 138, or it may include multiple reciprocating pistons. In one embodiment, as shown in the Figures, engine 158 may include two pistons, a top piston 140 attached to the top of body 112, and a bottom piston 142 attached to the bottom of the body 112. In addition, multiple dwell cycle cranks may be linked together with multiple reciprocating pistons to provide added cylinders and power to the engine.

The housing 146 may be included in engine 158. See FIGS. 10-12. Housing 146 may be for housing dwell cycle crank 100 or multiple dwell cycle cranks 100. The housing may be any size or shape housing adapted for housing dwell cycle crank 100 or multiple dwell cycle cranks 100. In one embodiment, as shown in the Figures, housing 146 may include an open top end 148, an open bottom end 150, and/or an open side 152. The open top end 148 may be adapted to fit top piston 140. The open bottom end 150 may be adapted to fit the bottom piston 142. The open side 152 may be adapted for mounting an axel to crankshaft 132.

A mounting bracket or brackets 154 may be included with housing 146 in engine 158. See FIGS. 11-12. Mounting bracket 154 may be for positioning dwell cycle crank 100 inside housing 146. Mounting bracket 154 may be any size or shape bracket adapted for positioning dwell cycle crank 100 inside housing 146. In one embodiment, mounting bracket 154 may include two brackets adapted to connect to both sides of dwell cycle crank 100 via crankshaft 132.

A plurality of mounting points 156 may be included with housing 146 in engine 158. Mounting points 156 may be for mounting the engine 158. For example, mounting points 156 may be for mounting engine 158 in the engine compartment of an automobile or car. Mounting points 156 may be adapted to mount engine 158 on any side and may include any number of mounting points 156.

The instant invention also includes a method of maximizing volumetric and geometric efficiency of an engine. The method includes the steps of: providing dwell cycle crank 100, as described above; positioning the dwell cycle crank 100 in a housing 146 for an internal combustion engine 158; and mounting dwell cycle crank 100 to the inside of housing 146 via a mounting bracket 154.

The benefit of the configuration of the dwell cycle crank described above is the elimination of the heavy contact points at the top and bottom of the S-shaped cam. With the use of the rollers, the contact between the follower and the body is always a surface contact. This is thought to reduce the wear and tear between the cam and the body and to extend the life of the dwell cycle crank.

It is noted that the dwell cycle crank 100 may encompass a variety of alternatives to the various features thereof. For example, the dwell cycle crank 100 has application in a variety of different engines, and it is not limited to ICEs. The various parts may be constructed from any combination of metals or materials that suitable for the desired efficiency and performance.

It is to be understood that the present invention is not limited to the embodiments described above, but encompasses any and all embodiments within the scope of the following claims. As a result, the present invention may be embodied in other forms without departing from the spirit and the essential attributes thereof, and, accordingly, reference should be made to the appended claims, rather than to the foregoing specification, as indicated in the scope of the invention.

I claim:

1. A dwell cycle crank comprising:
a follower;
a top roller having a bottom portion removed, said removed bottom portion being adapted to fit the top of said follower; and
a bottom roller having a top portion removed, said removed top portion being adapted to fit the bottom of said follower;
said top and bottom rollers being positioned within a body where each roller being adapted to rotate for allowing said follower to ride between said rollers within said body in an S-shaped pattern.

2. The dwell cycle crank of claim 1 wherein:
said follower being substantially oval shaped; and
said top and bottom rollers being substantially circular shaped.

3. The dwell cycle crank of claim 2 wherein said two rollers having the same dimensions.

4. The dwell cycle crank of claim 1 wherein said top roller having top outwardly extending flanges on both sides of said removed bottom portion, and said bottom roller having bottom outwardly extending flanges on both sides of said removed top portion.

5. The dwell cycle crank of claim 1 wherein said body comprising:
a first hole adapted to house said top roller; and
a second hole adapted to house said bottom roller;
wherein, said first and second holes including an overlapping section.

6. The dwell cycle crank of claim 5 wherein said follower being adapted to be positioned in said overlapping section of said first and second holes between said removed portions of said top and bottom rollers.

7. The dwell cycle crank of claim 6 wherein said first hole having an extended radius on its right side and said second hole having an extended radius on its . left side, said extended radiuses being adapted to create an S-shaped cam for said follower.

8. The dwell cycle crank of claim 7 wherein the rotation of said rollers within said body creating said S-shaped cam for said follower to move in said S-shaped pattern within said S-shaped cam.

9. The dwell cycle crank of claim 8 wherein said top and bottom outwardly extending flanges of said top and bottom rollers being adapted to maintain said follower in said S-shaped slotted cam.

10. The dwell cycle crank of claim 1 further comprising:
a crankshaft having a torque arm operatively attached to said follower, wherein said torque arm being an offset journal.

11. The dwell cycle crank of claim 10 wherein the movement of said follower riding in said S-shaped cam during a cycle of said crankshaft creating periodic dwells and strokes;
   whereby, said periodic dwells and strokes being adapted for maximizing volumetric and geometric efficiency of an engine.

12. An engine comprising:
   a dwell cycle crank comprising:
      a follower;
      a top roller having a bottom portion removed, said removed bottom portion being adapted to fit the top of said follower; and
      a bottom roller having a top portion removed, said removed top portion being adapted to fit the bottom of said follower;
      said top and bottom rollers being positioned within a body where each roller being adapted to rotate for allowing said follower to ride between said rollers within said body in an S-shaped pattern.

13. The engine of claim 12 wherein:
   said follower being substantially oval shaped;
   said removed bottom portion including top outwardly extending flanges and said removed top portion including bottom outwardly extending flanges;
   said top and bottom rollers being substantially circular shaped and having the same dimensions;
   said body comprising:
      a first hole adapted to house said top roller; and
      a second hole adapted to house said bottom roller;
      said first and second holes including an overlapping section;
      said follower being adapted to be positioned in said overlapping section of said first and second holes between said removed portions of said top and bottom rollers;
      said first hole having an extended radius on its right side and said second hole having an extended radius on its left side, said extended radiuses being adapted to create an S-shaped cam for said follower, wherein the rotation of said rollers within said body creating said S-shaped cam for said follower to move in said S-shaped pattern within said S-shaped cam;
      said outwardly extending flanges of said follower adapted to maintain said follower in said S-shaped slotted cam.

14. The engine of claim 12 wherein said dwell cycle crank further comprising:
   a crankshaft having a torque arm operatively attached to said follower, wherein said torque arm being an offset journal.

15. The engine of claim 14 wherein the movement of said follower riding in said S-shaped cam during a cycle of said crankshaft creating periodic dwells and strokes;
   whereby, said periodic dwells and strokes being adapted for maximizing volumetric and geometric efficiency of the engine.

16. The engine of claim 12 further comprising:
   a reciprocating piston having a piston cylinder being attached to said body.

17. The engine of claim 16, wherein said engine comprising two pistons, a top piston attached to the top of said body, and a bottom piston attached to the bottom of said body.

18. The engine of claim 12 further comprising a housing, said housing being adapted for housing said dwell cycle crank.

19. The engine of claim 18 wherein said housing comprising:
   an open top end adapted to fit said top piston;
   an open bottom end adapted to fit said bottom piston;
   an open side adapted for mounting an axel to said crankshaft;
   a mounting bracket adapted to position said dwell cycle crank inside said housing; and
   a plurality of mounting points adapted for mounting said engine.

20. A method of maximizing volumetric and geometric efficiency of an engine comprising the steps of:
   providing a dwell cycle crank comprising:
      a follower being substantially oval shaped;
      a top roller being substantially circular shaped with a portion removed, said removed portion being adapted to fit the top of said substantially oval shaped follower; and
      a bottom roller being substantially circular shaped with a portion removed, said removed portion being adapted to fit the bottom of said substantially oval shaped follower;
      said top and bottom rollers being positioned within a body where each roller being adapted to rotate for allowing said follower to ride between said rollers within said body in an S-shaped pattern; and
   positioning said dwell cycle crank in a housing of an internal combustion engine; and
   mounting dwell cycle crank 100 to the inside of said housing via a mounting bracket.

* * * * *